United States Patent
Kim et al.

(10) Patent No.: US 10,629,940 B2
(45) Date of Patent: Apr. 21, 2020

(54) BATTERY CELL INCLUDING STEPPED STRUCTURE

(71) Applicant: LG CHEM, LTD., Seoul (KR)

(72) Inventors: Ki Tae Kim, Daejeon (KR); Dong Myung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 314 days.

(21) Appl. No.: 14/647,228

(22) PCT Filed: Mar. 3, 2014

(86) PCT No.: PCT/KR2014/001714
§ 371 (c)(1),
(2) Date: May 26, 2015

(87) PCT Pub. No.: WO2014/137112
PCT Pub. Date: Sep. 12, 2014

(65) Prior Publication Data
US 2015/0372337 A1  Dec. 24, 2015

(30) Foreign Application Priority Data

Mar. 4, 2013  (KR) .................. 10-2013-0022640

(51) Int. Cl.
*H01M 10/04* (2006.01)
*H01M 2/02* (2006.01)
(Continued)

(52) U.S. Cl.
CPC ....... *H01M 10/0431* (2013.01); *H01M 2/021* (2013.01); *H01M 2/0212* (2013.01);
(Continued)

(58) Field of Classification Search
CPC .. H01M 10/043; H01M 2/021; H01M 2/0212; H01M 2/0217; H01M 2/0237;
(Continued)

(56) References Cited

U.S. PATENT DOCUMENTS

| 6,689,511 B2 | 2/2004 | Yamada et al. |
| 2001/0005561 A1 | 6/2001 | Yamada et al. |

(Continued)

FOREIGN PATENT DOCUMENTS

| EP | 2 058 878 A1 | 5/2009 |
| EP | 2 325 932 A1 | 5/2011 |

(Continued)

OTHER PUBLICATIONS

Machine translation of KR 20030066960 A.*
(Continued)

*Primary Examiner* — Sarah A. Slifka
(74) *Attorney, Agent, or Firm* — Birch, Stewart, Kolasch & Birch, LLP (57) ABSTRACT

Disclosed herein is a battery cell including an electrode assembly configured to have a structure in which two or more electrode rolls are stacked in a height direction on the basis of a plane, wherein the electrode rolls have the same size or at least two of the electrode rolls have different sizes, and the electrode rolls having different sizes are stacked to form one or more stepped structures in width and/or height.

23 Claims, 7 Drawing Sheets

(51) Int. Cl.
*H01M 10/0587* (2010.01)
*H01M 10/052* (2010.01)

(52) U.S. Cl.
CPC ....... *H01M 2/0217* (2013.01); *H01M 2/0237* (2013.01); *H01M 10/052* (2013.01); *H01M 10/0587* (2013.01); *H01M 2/0275* (2013.01); *H01M 2/0287* (2013.01); *H01M 2002/0205* (2013.01); *H01M 2220/10* (2013.01); *H01M 2220/20* (2013.01); *H01M 2220/30* (2013.01); *Y02E 60/122* (2013.01); *Y02T 10/7011* (2013.01)

(58) Field of Classification Search
CPC ........... H01M 10/052; H01M 10/0587; H01M 2/0275; H01M 2/0287; H01M 2002/0205; H01M 2220/10; H01M 2220/30; Y02E 60/122; Y02T 10/7011
See application file for complete search history.

(56) References Cited

U.S. PATENT DOCUMENTS

| | | | | |
|---|---|---|---|---|
| 2007/0231683 | A1* | 10/2007 | Lee | H01M 2/021 429/161 |
| 2008/0137890 | A1* | 6/2008 | Petersen | H01M 4/66 381/323 |
| 2011/0104550 | A1* | 5/2011 | Ahn | H01M 2/18 429/131 |
| 2011/0183169 | A1 | 7/2011 | Bhardwaj et al. | |
| 2011/0183183 | A1 | 7/2011 | Grady et al. | |
| 2012/0015236 | A1* | 1/2012 | Spare | H01M 2/0275 429/162 |
| 2013/0108906 | A1* | 5/2013 | Bhardwaj | H01M 10/0431 429/94 |
| 2013/0273413 | A1* | 10/2013 | Fahlgren | H01M 2/1022 429/159 |

FOREIGN PATENT DOCUMENTS

| | | |
|---|---|---|
| EP | 2 750 221 A1 | 7/2014 |
| JP | 10270069 A * | 10/1998 |
| JP | 2003-234094 A | 8/2003 |
| JP | 3680797 B2 | 8/2005 |
| KR | 2003-0066960 A | 8/2003 |

OTHER PUBLICATIONS

English machine translation of Yamamoto et al. (JP 10270069 A) (Year: 1998).*
International Search Report issued in PCT/KR2014/001714, dated Jun. 5, 2014.

* cited by examiner

BATTERY CELL INCLUDING STEPPED STRUCTURE

TECHNICAL FIELD

The present invention relates to a battery cell including a stepped structure, and more particularly to a battery cell including an electrode assembly configured to have a structure in which two or more electrode rolls are stacked in a height direction on the basis of a plane, wherein the electrode rolls have the same size or at least two of the electrode rolls have different sizes, and the electrode rolls having different sizes are stacked to form one or more stepped structures in width and/or height.

BACKGROUND ART

With remarkable development of information technology (IT), a great variety of portable information communication devices has been popularized. As a result, in the $21^{st}$ century, we are moving toward a ubiquitous society in which high-quality information service is possible regardless of time and place.

Secondary batteries are very important to realize such a ubiquitous society. Specifically, secondary batteries, which can be charged and discharged, have been widely used as an energy source for wireless mobile devices. In addition, the secondary batteries have also been used as an energy source for electric vehicles and hybrid electric vehicles, which have been proposed to solve problems, such as air pollution, caused by existing gasoline and diesel vehicles using fossil fuel.

As devices, to which the secondary batteries are applicable, are diversified as described above, the secondary batteries have also been diversified such that the secondary batteries can provide outputs and capacities suitable for devices to which the secondary batteries are applied. In addition, there is a strong need to reduce the size and weight of the secondary batteries.

Based on the shape of a battery case, the secondary batteries may be classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

The electrode assembly mounted in the battery case functions as a power generating element, having a positive electrode/separator/negative electrode stack structure, which can be charged and discharged. The electrode assembly may be classified as a jelly-roll type electrode assembly configured to have a structure in which a long sheet type positive electrode and a long sheet type negative electrode, to which active materials are applied, are wound in a state in which a separator is disposed between the positive electrode and the negative electrode, or a stacked type electrode assembly configured to have a structure in which a plurality of positive electrodes having a predetermined size and a plurality of negative electrodes having a predetermined size are sequentially stacked in a state in which separators are disposed respectively between the positive electrodes and the negative electrodes.

Figure 1:
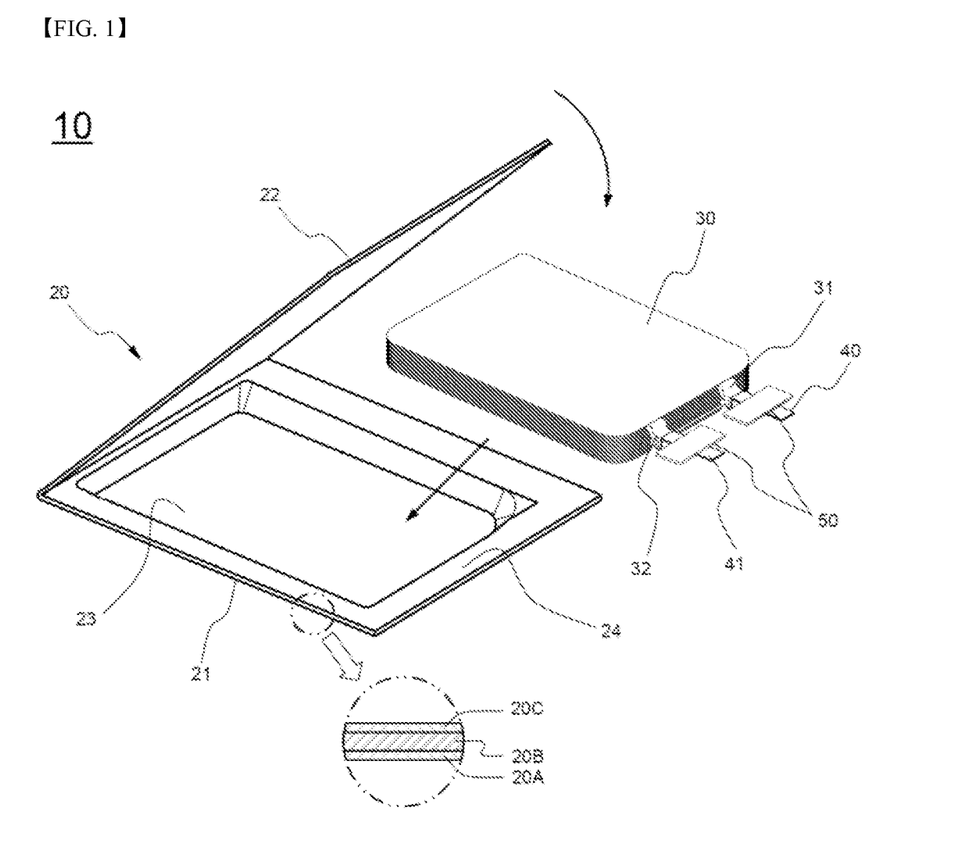
FIG. 1 is an exploded perspective view showing a conventional pouch-shaped battery cell.

FIG. 1 is a view showing a general structure of a pouch-shaped battery cell including a stacked type electrode assembly.

Referring to FIG. 1, a pouch-shaped battery cell 10 may be configured to have a structure in which an electrode assembly 30, including positive electrodes, negative electrodes, and separators disposed respectively between the positive electrodes and the negative electrodes, each separator being coated with a solid electrolyte, is mounted in a pouch-shaped battery case 20 in a sealed state such that two electrode leads 40 and 41 electrically connected to positive electrode and negative electrode tabs 31 and 32 of the electrode assembly 30 are exposed to the outside.

The battery case 20 includes a case body 21 having a depressed receiving part 23, in which the electrode assembly 30 is located, and a cover 22 integrally connected to the case body 21.

The battery case 20 is made of a laminate sheet including an outer resin layer 20A constituting the outermost layer of the laminate sheet, an isolation metal layer 20B for preventing penetration of materials, and an inner resin layer 20C for sealing.

The positive electrode tabs 31 and the negative electrode tabs 32 of the stacked type electrode assembly 30 are respectively coupled to the electrode leads 40 and 41 by welding. In addition, insulative films 50 are attached to the top and bottom of each of the electrode leads 40 and 41 to prevent the occurrence of a short circuit between a thermal welding device (not shown) and the electrode leads 40 and 41 and to secure sealing between the electrode leads 40 and 41 and the battery case 20 when the upper end 24 of the case body 21 and the upper end of the cover 22 are thermally welded to each other using the thermal welding device.

In recent years, however, new types of battery cells have been required in accordance with a trend change for a slim type design or various other designs. Specifically, there are needed battery cells that can be efficiently mounted even in devices which do not have a sufficient battery cell receiving space according to the reduction in size and thickness of the devices.

In addition, conventional devices were manufactured so as to have an approximately rectangular parallelepiped shape. In recent years, however, there have been developed devices having various other shapes. Battery cells having a rectangular parallelepiped shape or a cylindrical shape may not be efficiently mounted in the devices having various other shapes as described above.

For example, sides of a smartphone may be curved to improve grip. In a case in which a battery cell having the rectangular parallelepiped shape or a battery pack having the rectangular parallelepiped shape is mounted in a device designed so as to have such curved portions, however, space utilization of the device may be lowered.

That is, the curved portions of the device have dead spaces, in which the battery cell cannot be mounted. Such dead spaces lower the capacity of the device per volume.

Therefore, there is a high necessity for a battery cell configured to have a structure that is capable of reducing dead spaces in devices having various shapes such that the battery cell can be efficiently mounted in the devices while having maximized capacity.

DISCLOSURE

Technical Problem

The present invention has been made to solve the above problems and other technical problems that have yet to be resolved.

Specifically, it is an object of the present invention to provide a battery cell configured to have a structure in which the battery cell can be mounted in various spaces of a device, whereby it is possible to maximally utilize an internal space of the device, and the battery cell can be efficiently mounted in various shapes of the device in addition to a rectangular parallelepiped shape of the device.

Technical Solution

In accordance with one aspect of the present invention, the above and other objects can be accomplished by the provision of a battery cell including an electrode assembly configured to have a structure in which two or more electrode rolls are stacked in a height direction on the basis of a plane, wherein the electrode rolls have the same size or at least two of the electrode rolls have different sizes, and the electrode rolls having different sizes are stacked to form one or more stepped structures in width and/or height.

The battery cell according to the present invention is based on the specific structure as described above. Consequently, it is possible to manufacture battery cells having various capacities and sizes based on the battery cell according to the present invention. Furthermore, the battery cell according to the present invention may be efficiently mounted in various spaces of a device in which the battery cell is mounted. Consequently, it is possible to maximally utilize an internal space of the device.

In addition, a battery case of the battery cell has a shape corresponding to an external shape of the electrode assembly. Consequently, it is possible to increase the capacity of the battery cell and, in addition, to improve utilization of a surplus space of the battery cell based on a compact structure of the battery cell.

Meanwhile, a jelly-roll type electrode assembly, which is manufactured by winding electrodes, generally has a cylindrical structure or a plate-shaped structure having an elliptical shape in section. For this reason, it is difficult to receive the jelly-roll type electrode assembly in battery cases configured to have various shapes, such as an asymmetric shape and a stair shape.

In the battery cell according to the present invention, on the other hand, the electrode assembly is configured to have a structure in which two or more electrode rolls having different sizes are stacked. Consequently, it is possible to manufacture a battery cell having a stepped structure without greatly remodeling conventional equipment.

The electrode rolls each are configured to have a circularly or elliptically wound structure in vertical section in a direction in which electrode tabs protrude. For example, each elliptically wound electrode roll may be an electrode roll which is wound to have an elliptical structure in which the width is greater than the height. Each elliptically wound electrode roll may be manufactured by winding an assembly electrode sheet into an elliptical shape or winding the assembly electrode sheet into a circular shape in vertical section and pressing the circularly wound assembly electrode sheet.

The electrode rolls may each have various shapes, such as a polygonal shape, a circular shape, an elliptical shape, and an arc shape. For example, the electrode rolls may each have a rectangular planar shape. However, the present invention is not limited thereto. Some of the electrode rolls may each have a rectangular planar shape, and the rest of the electrode rolls may each have a planar shape other than the rectangular planar shape.

As described above, at least two of the electrode rolls may have different structures. For example, in the stacked structure of the electrode rolls, an upper one of the electrode rolls and a lower one of the electrode rolls may be different from each other in terms of at least one selected from among a thickness, a breadth (horizontal length), and a width (vertical length).

For example, the upper electrode roll and the lower electrode roll may have different planar sizes. In this case, the upper electrode roll may have a smaller planar size than the lower electrode roll.

In a concrete example, the electrode rolls may be stacked in a state in which one sides of the electrode rolls are aligned in a straight line. That is, one sides of the electrode rolls may be adjacent to each other in a vertical direction. At this time, the electrode tabs may be located at the aligned sides of the electrode rolls. Consequently, the electrode tabs may be easily connected to each other.

In a concrete example, two of the electrode rolls which are stacked up and down may be configured to have a structure in which a first electrode roll and a second electrode roll, which are formed by respectively winding one end and the other end of an assembly electrode sheet including a positive electrode sheet, a negative electrode sheet, a first separation sheet disposed between the negative electrode sheet and the positive electrode sheet, and a second separation sheet facing the first separation sheet in a state in which the negative electrode sheet or the positive electrode sheet is disposed between the second separation sheet and the first separation sheet, are stacked.

The first electrode roll and the second electrode roll may each be formed by winding the assembly electrode sheet in a clockwise direction or in a counterclockwise direction. That is, the first electrode roll and the second electrode roll may each be formed by winding the assembly electrode sheet in the same direction or in opposite directions. Specifically, both the first electrode roll and the second electrode roll are configured to have a structure in which the assembly electrode sheet is wound in the clockwise direction or wound in the counterclockwise direction. Alternatively, one of the first electrode roll and the second electrode roll may be configured to have a structure in which the assembly electrode sheet is wound in the clockwise direction, and the other of the first electrode roll and the second electrode roll may be configured to have a structure in which the assembly electrode sheet is wound in the counterclockwise direction.

The battery cell may be a pouch-shaped battery cell configured to have a structure in which the electrode rolls are received in a pouch-shaped battery case, the electrode rolls are impregnated with an electrolyte, and the battery case is sealed. Specifically, the battery cell may be configured to have a structure in which the electrode assembly is received in a pouch-shaped battery case, the electrode assembly is impregnated with an electrolyte, and the battery case is sealed by thermal welding in a state in which a positive electrode terminal and a negative electrode terminal protrude outward from the battery case.

The battery case may be a pouch-shaped battery case made of a laminate sheet including a metal layer and a resin layer.

The laminate sheet may be configured to have a structure in which resin layers are applied to opposite major surfaces of a metal blocking layer. For example, the laminate sheet may be configured to have a structure in which an outer resin layer exhibiting high durability is attached to one major surface (outer surface) of the metal blocking layer and a resin sealant layer exhibiting a high thermal bonding property is attached to the other major surface (inner surface) of the metal blocking layer.

In a concrete example, the metal blocking layer may be made of aluminum exhibiting a gas intercepting property and sufficient ductility to configure in the form of a thin film.

It is required for the outer resin layer to exhibit high resistance against external environment. For this reason, the outer resin layer may be made of a polymer resin, such as polyethylene terephthalate (PET) or oriented nylon film, exhibiting more than predetermined tensile strength and weather resistance.

In addition, the resin sealant layer may be made of a cast polypropylene (CPP) resin which exhibits a high thermal welding property (thermal adhesive property) and a low hygroscopic property, which is necessary to restrain permeation of an electrolyte, and is neither expanded nor corroded by the electrolyte.

Meanwhile, the battery case may be configured to have a structure having a receiving part corresponding to the outside of the electrode assembly. For example, the battery case may be provided with a receiving part having a stepped structure in width and height.

Specifically, the battery case may include one or more receiving parts having different widths and heights. The receiving parts having different sizes may be different from each other in terms of a horizontal length and/or a vertical length.

A region of the battery case at which the stepped structure is formed is not particularly restricted. Specifically, the stepped structure may be formed at a region of the battery case at which the electrode terminals are not formed or at a region of the battery case at which the electrode terminals are formed. Alternatively, the stepped structure may be formed not only at a region of the battery case at which the electrode terminals are not formed but also at a region of the battery case at which the electrode terminals are formed.

In a concrete example, the battery case is provided with a first receiving part and a second receiving part for receiving the first electrode roll and the second electrode roll having different sizes, respectively.

The first receiving part and the second receiving part are configured to have structures corresponding to external shapes of the first electrode roll and the second electrode roll, respectively. Consequently, the first receiving part and the second receiving part may have different sizes.

For example, the first receiving part and the second receiving part may be different from each other in terms of at least one selected from among a thickness, a breadth (horizontal length), and a width (vertical length).

In addition, the first receiving part may have a larger depth that the second receiving part.

On the other hand, the first receiving part may have a larger planar area than the second receiving part.

Meanwhile, one side of the first receiving part and one side of the second receiving part may be adjacent to each other in a vertical direction. At this time, the electrode terminals may be located at one side of the first receiving part and one side of the second receiving part adjacent to each other.

In addition, the battery case may include an upper case, at which the first receiving part is formed, and a lower case, at which the second receiving part is formed, and the electrode rolls having different sizes may be received in the first receiving part and the second receiving part. Specifically, the first receiving part and the second receiving part may have different sizes such that the electrode rolls having different sizes can be received in the first receiving part and the second receiving part.

When the upper case and the lower case are coupled to each other, therefore, a step may be formed at the battery case due to the difference in size between the receiving parts.

The battery cell may be a lithium ion battery cell or a lithium ion polymer battery cell. However, the present invention is not limited thereto.

In accordance with another aspect of the present invention, there is provided a device including the battery cell with the above-stated construction as a power source. The device may be any one selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

The structure and manufacturing method of the device are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 2:
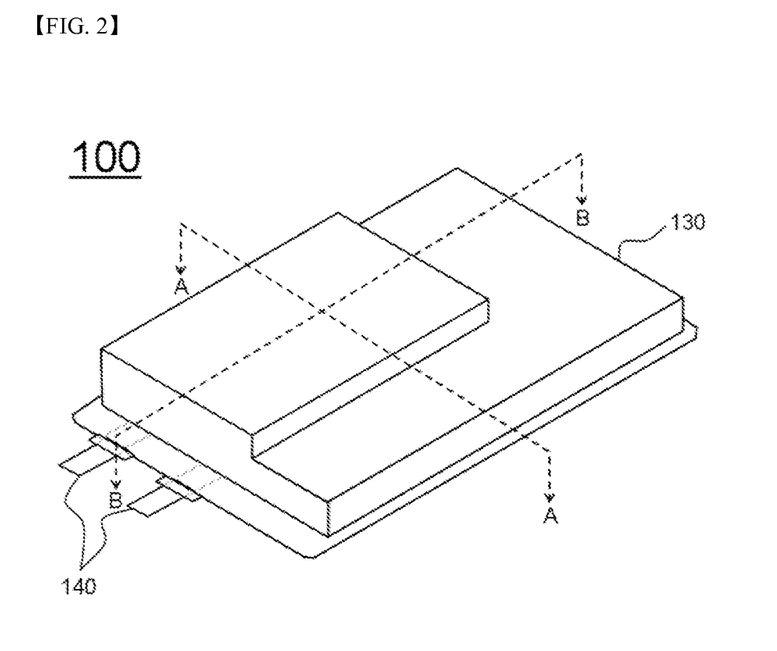
FIG. 2 is a perspective view showing a battery cell according to an embodiment of the present invention.
Figure 3:
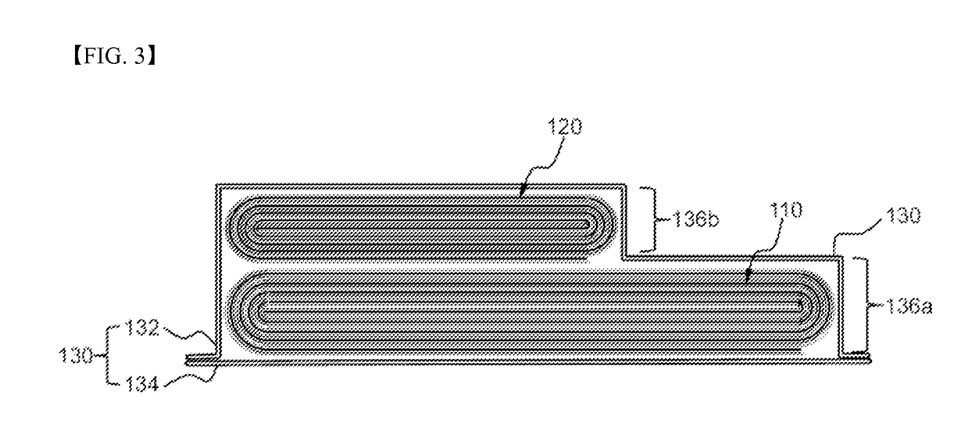
FIG. 3 is a vertical sectional view taken along line A-A of FIG. 2.

FIG. 2 is a perspective view showing a battery cell according to an embodiment of the present invention, and FIG. 3 is a vertical sectional view taken along line A-A of FIG. 2.

Referring to FIGS. 2 and 3, a battery cell 100 is configured to have a structure including an electrode assembly including a first electrode roll 110 and a second electrode roll 120, and a battery case 130 for receiving the electrode assembly.

The battery cell 100 is configured to have a structure in which the electrode rolls 110 and 120, each of which has an elliptical shape in vertical section, are mounted in the pouch-shaped battery case 130, which is made of a laminate sheet, and electrode leads 140 electrically connected to the first electrode roll 110 and the second electrode roll 120 protrude outward from the battery case 130. The battery case 130 includes an upper case 132 and a lower case 134. The upper case 132 is provided with receiving parts 136a and 136b for receiving the first electrode roll 110 and the second electrode roll 120. The receiving parts 136a and 136b are formed to have shapes corresponding to outer surfaces of the first electrode roll 110 and the second electrode roll 120.

The first electrode roll 110 and the second electrode roll 120, which have different sizes, constituting the electrode assembly are stacked in a height direction on the basis of a plane. The first electrode roll 110 and the second electrode roll 120 are located in the first receiving part 136a and the second receiving part 136b of the battery case 130, respectively.

The first receiving part 136a and the second receiving part 136b each are configured to have a rectangular shape when viewed from above. The planar area and the vertical sectional thickness of the second receiving part 136b are less than those of the first receiving part 136a.

In this structure, the battery cell 100 has a step in vertical section. Consequently, a margin space is defined at the outside of the step. The margin space is provided to cope with various conditions, such as irregular internal space of a device, to which the battery cell is applied, and interference with other parts. The receiving parts 136a and 136b of the battery case 130 and the electrode rolls 110 and 120 may be flexibly changed into various shapes based on conditions applied to the battery cell.

In a case in which the battery cell 100 has the above-described structure, it is possible to manufacture the battery cell such that the battery cell has various capacities and sizes, to easily mount the battery cell even in a space, in which a conventional battery cell is difficult to be mounted, and to mount the battery cell while having a larger capacity in a limited space according to the internal structure of a device, thereby maximizing utilization of the internal space of the device.

Figure 4:
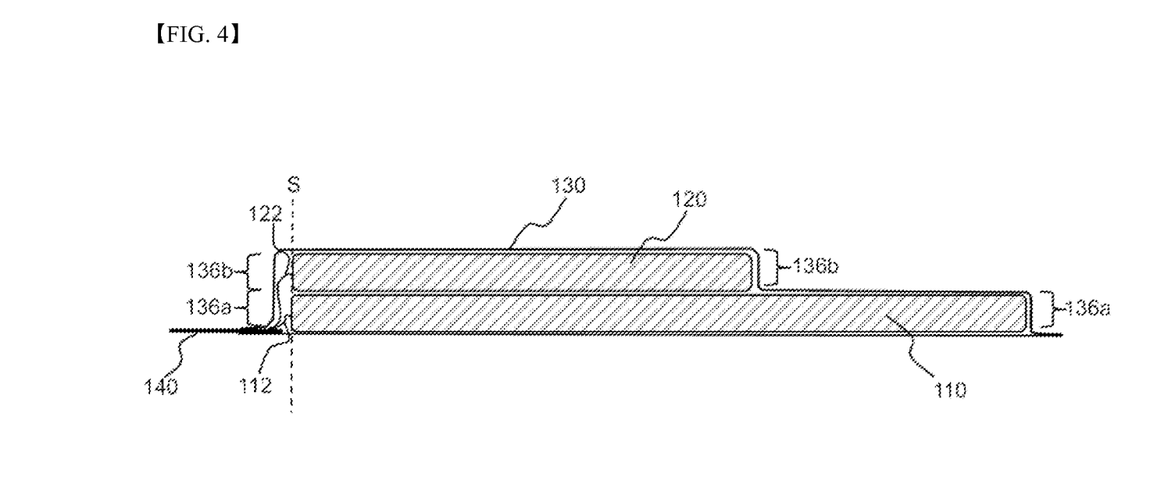
FIG. 4 is a vertical sectional view taken along line B-B of FIG. 2.

FIG. 4 is a vertical sectional view taken along line B-B of FIG. 2. Referring to FIG. 4, the first electrode roll 110 and the second electrode roll 120 are stacked in a state in which one side of the first electrode roll 110 and one side of the second electrode roll 120 are aligned in a straight line S. Electrode tabs 112 and 122 are located at one side of the first electrode roll 110 and one side of the second electrode roll 120, respectively. The electrode tabs 112 and 122 are coupled to electrode leads 140. One end of each of the electrode leads 140 protrudes outward from the battery case 130 to form an electrode terminal.

The first receiving part 136a and the second receiving part 136b, in which the first electrode roll 110 and the second electrode roll 120 are received, respectively, are adjacent to each other in a vertical direction at one side of the first receiving part 136a at which one of the electrode terminals 140 is located and at one side of the second receiving part 136b at which the other of the electrode terminals 140 is located.

Figure 5:
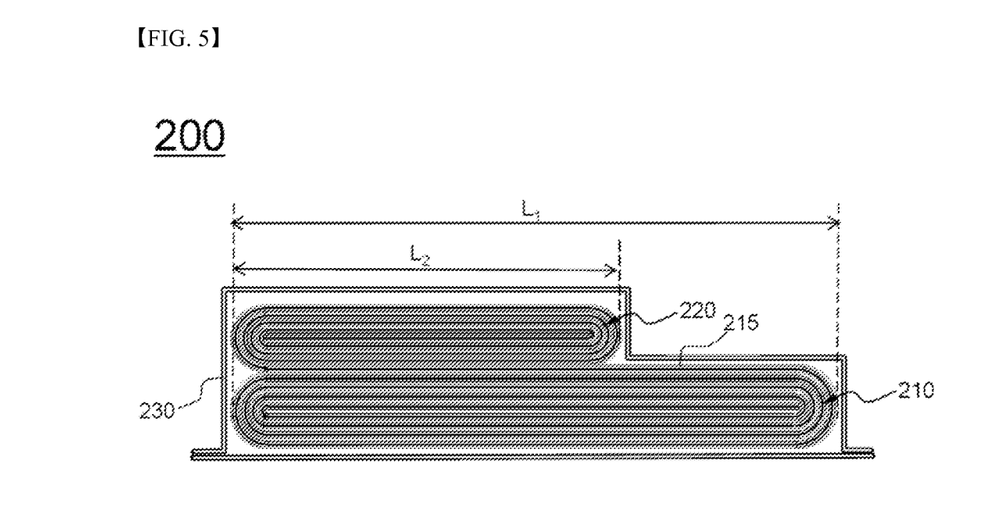
FIG. 5 is a vertical sectional view showing a battery cell according to another embodiment of the present invention.

FIG. 5 is a vertical sectional view showing a battery cell according to another embodiment of the present invention.

Referring to FIG. 5, a battery cell 200 is configured to have a structure including an electrode assembly including a first electrode roll 210 and a second electrode roll 220, and a battery case 230 for receiving the electrode assembly.

The first electrode roll 210 and the second electrode roll 220 are manufactured by winding one end and the other end of an assembly electrode sheet 215 including a positive electrode sheet, a first separation sheet, a negative electrode sheet, and a second separation sheet, which are stacked. The first electrode roll 210 and the second electrode roll 220 are stacked in a vertical direction. A length $L_2$ of the second electrode roll 220 is less than a length $L_1$ of the first electrode roll 210. When the first electrode roll 210 and the second electrode roll 220 are stacked in the vertical direction, the battery cell has a stepped structure.

That is, the battery cell has a stair-shaped structure due to a length difference between the first electrode roll 210 and the second electrode roll 220.

The first electrode roll 210 and the second electrode roll 220 each are configured to have a structure in which the assembly electrode sheet 215 is wound approximately in an elliptical shape in vertical section. The first electrode roll 210 is configured to have a structure in which one end of the assembly electrode sheet 215 is wound in a counterclockwise direction, and the second electrode roll 220 is configured to have a structure in which the other end of the assembly electrode sheet 215 is wound in a clockwise direction.

The battery case 230 is configured to have a stepped structure corresponding to the stacked structure of the first electrode roll 210 and the second electrode roll 220 such that the first electrode roll 210 and the second electrode roll 220 can be efficiently mounted in the battery case 230.

Figure 6:
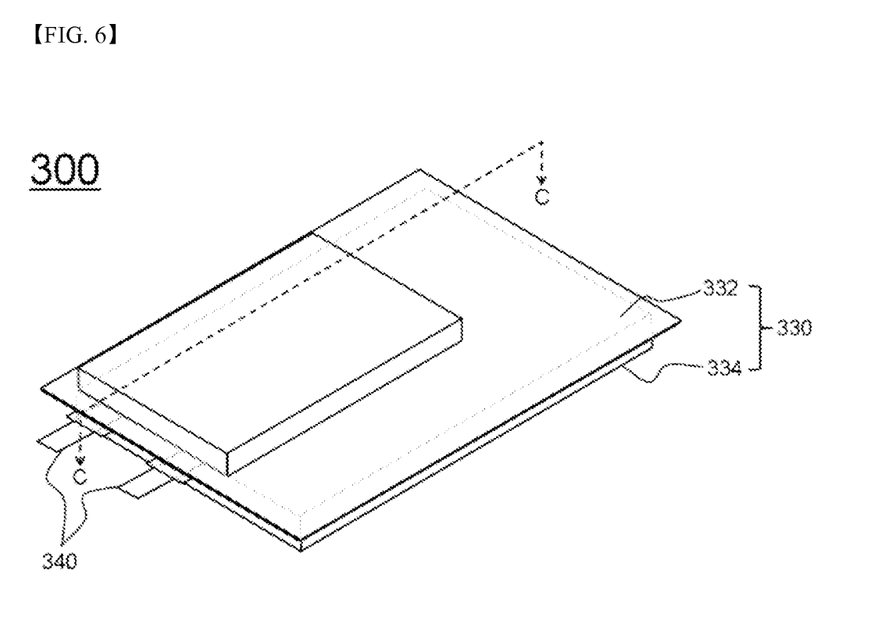
FIG. 6 is a perspective view showing a battery cell according to a further embodiment of the present invention.
Figure 7:
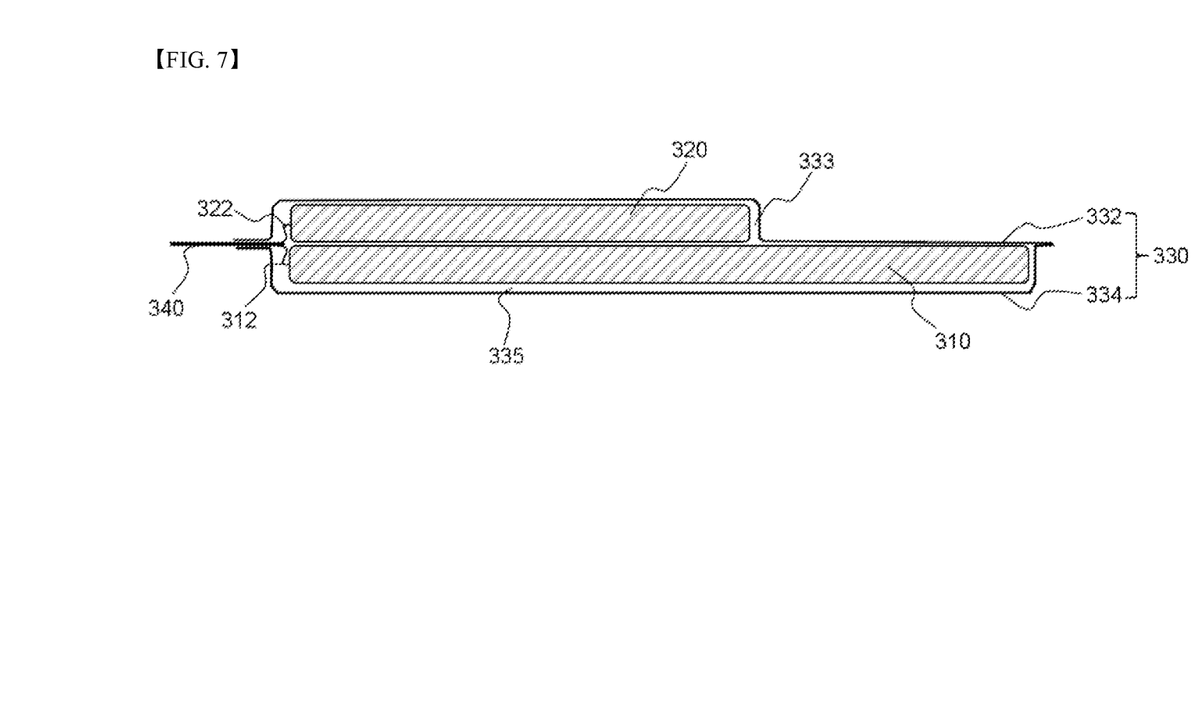
FIG. 7 is a vertical sectional view taken along line C-C of FIG. 6.

FIG. 6 is a perspective view showing a battery cell according to a further embodiment of the present invention, and FIG. 7 is a vertical sectional view taken along line C-C of FIG. 6.

Referring to FIGS. 6 and 7, a battery cell 300 is configured to have a structure in which an electrode assembly including a first electrode roll 310 and a second electrode roll 320 is mounted in a battery case 330 made of a laminate sheet, and electrode leads 340 electrically connected to the electrode rolls 310 and 320 protrude outward from the battery case 330. The battery case 330 includes an upper case 332 and a lower case 334. The upper case 332 and the lower case 334 are provided with a second receiving part 333 and a first receiving part 335 for receiving the second electrode roll 320 and the first electrode roll 310, respectively.

The first receiving part 335 and the second receiving part 335 of the battery case 330 are configured in the form of rectangles having different planar sizes. The receiving parts 335 and 333 have internal shapes corresponding to external shapes of the first electrode roll 310 and the second electrode roll 320. The first electrode roll 310 and the second electrode roll 320 have different planar lengths and planar widths. The first electrode roll 310 and the second electrode roll 320 are stacked in a height direction on the basis of a plane. The first electrode roll 310 and the second electrode roll 320 are received in the first receiving part 335 and the second receiving part 333 of the battery case 330, respectively.

In addition, the first electrode roll 310 and the second electrode roll 320 are stacked such that electrode tabs 312 and 322 are arranged in the same direction. The electrode tabs 312 and 322 are electrically connected to each other such that the electrode tabs 312 and 322 have the same polarities. Furthermore, one side of the first electrode roll 310 from which the electrode tabs 312 protrude and one side of the second electrode roll 320 from which the electrode tabs 322 protrude are adjacent to each other in a vertical direction such that the electrode tabs 312 and 322 can be easily connected to each other.

In the above-described embodiments of the present invention, the battery cell includes two electrode rolls. However, the present invention is not limited thereto. A battery cell configured to have a structure in which three or more electrode rolls are received in a battery case, and the electrode rolls are stacked in a state in which at least two of the electrode rolls have different sizes may be applied as an embodiment of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is configured such that electrode rolls having different sizes are stacked to form a stepped structure, whereby it is possible to easily secure a battery cell installation space, to maximally utilize an internal space of a device by utilizing a dead space defined in the device, to mount a high-capacity battery cell in the device, and to more miniaturize the device.

The invention claimed is:

1. A battery cell comprising an electrode assembly configured to have a structure in which at least two electrode rolls are stacked in a height direction on the basis of a plane, wherein
the at least two electrode rolls have different sizes,
the at least two electrode rolls are stacked to form one or more stepped structures in width and height, and
the at least two electrode rolls which are stacked in the height direction on the basis of the plane are configured to have a structure of a first electrode roll and a second electrode roll, which are formed by winding one end of a single continuous assembly electrode sheet in a clockwise or counter clockwise direction and winding the other end of the single continuous assembly electrode sheet in a clockwise or counter clockwise direction, the single continuous assembly electrode sheet consisting of a single continuous positive electrode sheet, a single continuous negative electrode sheet, a first separation sheet disposed between the single continuous negative electrode sheet and the single continuous positive electrode sheet, and a second separation sheet facing the first separation sheet in a state in which the single continuous negative electrode sheet or the single continuous positive electrode sheet is disposed between the second separation sheet and the first separation sheet, are stacked, and
wherein a length of the first electrode roll measured in a direction perpendicular to the height direction based on the plane is different than a length of the second electrode roll measured in the direction perpendicular to the height direction based on the plane.

2. The battery cell according to claim 1, wherein the at least two electrode rolls are each configured to have an elliptically wound structure in a vertical section in a direction in which electrode tabs protrude.

3. The battery cell according to claim 1, wherein the at least two electrode rolls each have a rectangular planar shape.

4. The battery cell according to claim 1, wherein, in the one or more stepped structures in which the at least two electrode rolls are stacked, an upper one of the at least two electrode rolls and a lower one of the at least two electrode rolls are different from each other in terms of at least one selected from among a thickness, a breadth (horizontal length), and a width (vertical length).

5. The battery cell according to claim 4, wherein the at least two electrode rolls having different sizes are different from each other in terms of a planar size such that at least one of the breadth and width are different.

6. The battery cell according to claim 1, wherein the at least two electrode rolls are stacked in a state in which one side of the at least two electrode rolls are aligned in a straight line.

7. The battery cell according to claim 6, wherein electrode tabs are located at the aligned side of the at least two electrode rolls.

8. The battery cell according to claim 1, wherein electrode tabs of the at least two electrode rolls are coupled to each other to form electrode terminals of the battery cell.

9. The battery cell according to claim 1, wherein one of the first electrode roll and the second electrode roll is configured to have a structure in which the single continuous assembly electrode sheet is wound in the clockwise direction, and the other of the first electrode roll and the second electrode roll is configured to have a structure in which the single continuous assembly electrode sheet is wound in the counter clockwise direction.

10. The battery cell according to claim 1, wherein the battery cell is a pouch-shaped battery cell configured to have a structure in which the at least two electrode rolls are received in a battery case, the at least two electrode rolls are impregnated with an electrolyte, the battery case is sealed by thermal welding, and a positive electrode terminal and a negative electrode terminal protrude outward from the battery case.

11. The battery cell according to claim 10, wherein the battery case is made of a laminate sheet comprising a metal layer and a resin layer.

12. The battery cell according to claim 10, wherein the battery case is provided with a receiving part having a stepped structure in width and height.

13. The battery cell according to claim 12, wherein the stepped structure is formed at a region of the battery case at which the positive electrode terminal and the negative electrode terminal are not formed.

14. The battery cell according to claim 10, wherein the battery case is provided with a first receiving part and a second receiving part for receiving a first electrode roll and a second electrode roll having different sizes, respectively.

15. The battery cell according to claim 14, wherein the first receiving part and the second receiving part are different from each other in terms of at least one selected from among a thickness, a breadth (horizontal length), and a width (vertical length).

16. The battery cell according to claim 14, wherein the first receiving part has a larger depth than the second receiving part.

17. The battery cell according to claim 14, wherein the first receiving part has a larger planar area than the second receiving part.

18. The battery cell according to claim 14, wherein one side of the first receiving part and one side of the second receiving part are adjacent to each other in a vertical direction.

19. The battery cell according to claim 18, wherein the positive electrode terminal and the negative electrode terminal are located at one side of the first receiving part and one side of the second receiving part adjacent to each other.

20. The battery cell according to claim 14, wherein the battery case comprises an upper case, at which the first receiving part is formed, and a lower case, at which the second receiving part is formed, and the at least two electrode rolls having different sizes are received in the first receiving part and the second receiving part.

21. The battery cell according to claim 1, wherein the battery cell is a lithium ion battery cell or a lithium ion polymer battery cell.

22. A device comprising a battery cell according to claim 1 as a power source.

23. The device according to claim 22, wherein the device is selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

* * * * *